March 5, 1935.  J. M. CROWE  1,993,337
FRUIT JUICE EXTRACTOR
Filed April 27, 1932
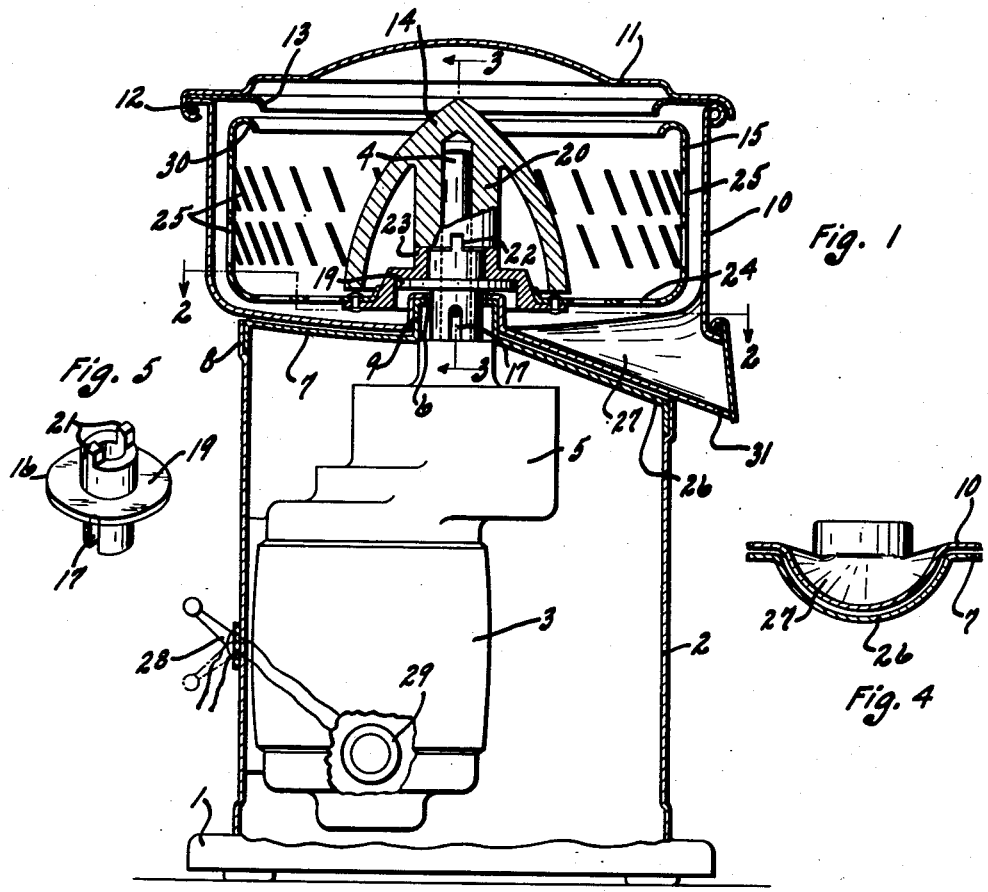
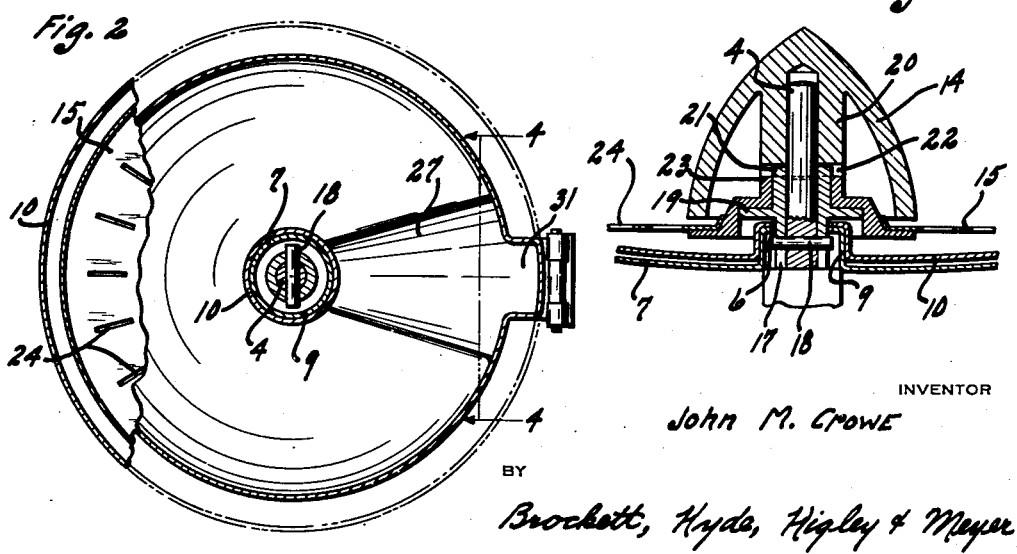
INVENTOR
John M. Crowe
BY
Brockett, Hyde, Higley & Meyer
ATTORNEYS Patented Mar. 5, 1935

1,993,337

UNITED STATES PATENT OFFICE 1,993,337

FRUIT JUICE EXTRACTOR

John M. Crowe, Covington, Ky., assignor to Fruit Juice Machine Company, Cincinnati, Ohio, a corporation of Ohio Application April 27, 1932, Serial No. 607,750

1 Claim. (Cl. 146—3)

My invention relates to a fruit juice extractor, and particularly, to a method and apparatus for extracting citrus fruit juices and delivering the extracted juice together with a desired amount of fruit pulp to a delivery receptacle such as a cup or the like.

One object of my invention is to provide a fruit juice extractor that is simple in construction and efficient in operation and embodies an improved driving connection between the juice extracting means and power operating means therefor, the driving connection being such as to lend itself readily to the removal of the various juice extracting parts of the apparatus for cleaning, replacement or substitution of such parts. This connection takes the form of a friction connection whose effectiveness is varied by the operation of reaming the fruit juice and pulp from the skin, the connection being such that the basket or strainer is ordinarily free to rotate independently of operation of the driving means whereby, after juice and pulp has been reamed from fruit, the extracting operation may continue for some time by inertia of the basket.

Another object of my invention is to provide a fruit juice extractor including a juice receiving shell or casing arranged to conform with the main shell or casing to prevent rotation of the juice receiving casing and so arranged that the fruit juice and pulp that passes through the strainer means will drain towards the center of the juice receiving shell or casing and thence outwardly to a discharge disposed below the level of the strainer within the juice receiving shell or casing. This construction prevents the fruit juices from being thrown out through the juice discharge opening by rotation of the strainer and permits an even flow of juice from the discharge opening.

Various other objects and advantageous features of my invention will be seen in the following description and one embodiment thereof may be seen in the accompanying drawing wherein similar characters of reference designate corresponding parts, and wherein:

Fig. 1 is a sectional view showing a fruit juice extracting apparatus constructed in accordance with my invention; Fig. 2 is a view taken on the line 2—2 of Fig. 1; Fig. 3 is a sectional view taken on the line 3—3 of Fig. 1; Fig. 4 is a sectional view taken on the line 4—4 of Fig. 2; and Fig. 5 is a perspective view of the dental clutch means for making a driving connection between the power means and the juice extracting parts of the apparatus.

Referring to the drawing, I have shown one embodiment of my invention as comprising a fruit juice extractor including a base 1 which supports a cylindrical or other shaped casing 2 that for appearance and convenience extends perpendicularly of the base 1, a motor or other power unit 3 being supported within this casing. As shown, the motor or power unit 3 is mounted on and supported by the casing 2 and drives a vertically extending shaft 4 through suitable reduction gearing 5. The shaft 4 extends upwardly through a central opening 6 in a casing cover 7 that interfits with the casing 2 as at 8 and is secured thereto by any well known means such as bolts, rivets, or the like.

Surrounding the central opening 6 in the cover 7 through which the shaft 4 extends, the cover 7 is provided with a central deformation providing a post 9 adapted to interfit with a corresponding post in the bottom of a casing 10, the casing 10 being adapted to rest on the uppermost end of the post 9 whereby the casing 10 may be assembled with or removed from the casing 2 at will. Such casing 10 is provided with a cover 11 hingedly mounted as at 12 and a supplemental cover ring 13 that is also hingedly mounted at 12 and may be moved with or independently of the cover 11. This supplemental cover ring provides a shield over the upper edge of an extracting basket that forms a part of my apparatus when the cover 11 is in raised position.

In accordance with my invention, the means for removing the juice and pulp from fruit and delivering the juice and the desired quantity of pulp or meat cells to a delivery receptacle consists of a removably mounted bulb 14 of the usual corrugated type, a slotted or perforated rotatable extractor basket or strainer 15 for subjecting the juice and pulp to centrifugal action and retaining the undesirable parts of the pulp and seeds in the basket while delivering only the juice and desirable pulp, and a means for making a driving connection between the motor or power unit 3 and the bulb and basket particularly during the time the juice and pulp is being removed from a piece of fruit by means of the reamer bulb 14.

This means for making the driving connection between the power unit 3 and the bulb and basket consists of a one-piece member 16 of the dental clutch type. As shown, this member 16 is adapted to loosely fit over the shaft 4 and be connected thereto so as to rotate therewith by means of a U-shaped slot 17 in the member that is adapted to fit over a pin 18 extending radially outwardly from the shaft 4. The member 16 is provided with an annular flange 19 on top of which the basket 15 is adapted to rest loosely (see Figs. 1 and 3) so that there will be no positive driving connection between the flange and the basket and the basket may either rotate loosely on the flange or a frictional driving connection may be made between the basket and flange due to the weight of the basket plus the fruit juice and pulp therein.

As shown in Figs. 1 and 3, the bulb 14 is provided internally with a sleeve member 20 adapted to fit over the shaft 4 and having a driving connection with the dental member 16 by means of teeth 21 on the upper side of the member 16 engaging grooves 22 in the bottom of the sleeve 20. The grooves 22 are somewhat deeper than the height of the teeth 21 whereby the lowermost end of the sleeve 20 rests on the upper end of the basket supporting collar 23 that rests on the annular flange 19 of the member 16. Ordinarily, the weight of the bulb resting on the basket supporting collar 23 is not sufficient to prevent free rotation of the basket 15 about the shaft 4. However, when a piece of fruit is manually placed on the rotating bulb 20 and pressure is exerted on the fruit to cause the pulp and juice to be reamed therefrom, such pressure will tightly clamp the basket supporting collar 23 between the lower end of the sleeve 20 and the upper surface of the annular flange 19, whereby a more or less positive driving connection will be produced between the basket 15 and the shaft 4 so that the basket will be rotated the same rate of speed as the shaft 4 and bulb 14. On release of pressure on the bulb 14, this more or less positive driving connection will be broken and the basket 15 will be free to rotate independently of the shaft 4 and bulb 14 under the force imparted to it through the more or less positive driving connection just described.

Referring to Figs. 1 and 2, the basket 15 is provided with radial slots 24 in its bottom through which fruit juice and small portions of pulp may flow in to the casing 10 and then to a delivery receptacle as hereinbefore described. Also, the vertical walls of the basket 15 are provided with slots 25 that are disposed diagonally to the vertical axis of the basket and preferably extend in a direction toward the direction of any rotation of the basket that occurs through the friction connection between the basket and shaft. A double row of these elongated slots 25 is provided in the vertical wall of the basket with each slot in one row in staggered relation with its adjacent slot in the other row and all of the slots are preferably inclined in the same direction from the vertical. On rotation of the basket 15, the pulp thrown outwardly against the side of the basket by centrifugal action and moving upwardly or downwardly along the side walls of the basket is subjected to a shearing action by the diagonal slots whereby a part of the pulp is cut into particles fine enough to pass through the slots in the basket. Also, different speeds of rotation of the basket caused by repeated engaging and disengaging of the more or less positive driving connection hereinbefore described will cause a slippage of the pulp along the walls of the basket and a further shearing action by reason of the diagonal slots as will be apparent.

As shown in Figs. 1, 3 and 4, the top 7 of the casing 2 slopes downwardly from its outer edges toward the center thereof with the exception of one portion which slopes downwardly from the center of the top toward the outer edge to form a trough portion, this trough portion 26 gradually increasing in width from the center of the top to the outer edge. The bottom of the casing 10 is shaped in conformity to the top of the casing 2 with the bottom of the casing 10 sloping downwardly from its outer edges to its center except for one portion 27 thereof which, like the top of the casing 2, slopes downwardly from the center of the bottom of the casing 10 toward the outer edge of the casing and gradually increases in width as it approaches such outer edge. This forms a discharge drain means for the casing 10. With the parts in assembled relation as shown in Fig. 1, the bottom of the casing 10 coincides in shape with the top of the casing 2 and outwardly and downwardly sloping trough portion 27 provides a discharge spout below the bottom of the basket 15. With this construction, the juice and pulp thrown into the casing 10 through the basket 15 flows toward the center of the casing 10 and thence out of the casing through the discharge spout which is located at a point below the bottom of the basket 15. This is desirable in that it provides a fruit juice extractor wherein the juice and pulp is extracted by centrifugal force with the discharge opening below the lowest point at which juice and pulp is thrown outwardly against the side walls of the casing whereby no juice and pulp will be forcefully thrown through the discharge opening but an even flow of juice and pulp from the casing may be had. Such construction also permits the apparatus to be constructed in an absolute vertical plane in contra-distinction to construction of the apparatus in a plane at an angle to the vertical whereby the juice and pulp will flow out of the casing 10.

In the operation of the device, the motor or power unit 3 having been placed in operation as by means of a suitable switch 28 and the adjustment of suitable speed control rheostat means 29 to rotate the bulb 14, and the basket 15 through the frictional connection hereinbefore described, the cover 11 is raised and a half section of fruit is pressed onto the bulb 14 in the well known manner. The fruit being held stationary, the rotating bulb 14 removes the juice and meat cells therefrom and these flow into the basket 15 which is rotated at substantially the same speed as the shaft 4 by the more or less positive driving connection formed by pressure on the bulb 14 wherein they are subjected to centrifugal action and a shearing action by reason of the slots in the basket. The juice and desirable portions of the pulp are thus strained and thrown outwardly into the casing 10 to flow to the center of the casing and thence outwardly through the discharge spout 31 into a suitable receptacle provided for that purpose. During this time, the large portions of the pulp and seeds are held in the basket 15 against the normal upward flow caused by rotation of the basket by the inturned overhanging top 30 provided on the basket for that purpose.

What I claim is:

In a fruit juice extractor having a stationary casing with a drainage opening, a base therefor containing a motor, a rotatably mounted extractor basket within said casing and a reamer within said basket, a driving connection from said motor to said reamer, extending through the bottom of said basket, and including a clutch unit providing positive drive between said motor and said reamer and permitting endwise reamer motion and having a surface in supporting relation with said basket for frictional drive of the latter, said basket having a part arranged to support said reamer, whereby said motor may have driving effect upon said basket, by way of said surface, dependent upon pressure of said reamer against said basket, as in the reaming operation.

JOHN M. CROWE.